United States Patent [19]

Andre

[11] Patent Number: 4,629,852
[45] Date of Patent: Dec. 16, 1986

[54] REGULATOR CIRCUIT FOR CONTROL OF HEAT OUTPUT OF A HEATING ELEMENT

[75] Inventor: Wolfram K. Andre, Aichwald, Fed. Rep. of Germany

[73] Assignee: Kurt Wolf & Co. KG, Fed. Rep. of Germany

[21] Appl. No.: 579,658

[22] Filed: Feb. 13, 1984

[30] Foreign Application Priority Data

Feb. 17, 1983 [DE] Fed. Rep. of Germany ....... 3305376

[51] Int. Cl.[4] .............................................. H05B 1/02
[52] U.S. Cl. .................... 219/497; 219/492; 323/236; 340/589; 99/325; 99/328
[58] Field of Search ............... 219/492, 493, 497, 501, 219/201; 307/117, 252 UA, 252 B; 323/235, 236; 99/325, 328, 331; 340/589, 588

[56] References Cited

U.S. PATENT DOCUMENTS

| | | | |
|---|---|---|---|
| 3,584,208 | 6/1971 | Slawson et al. ...................... | 235/183 |
| 4,088,871 | 5/1978 | Coulmance et al. ................. | 219/501 |
| 4,337,388 | 6/1982 | July .................................... | 219/497 |
| 4,338,511 | 7/1982 | Six ...................................... | 219/497 |
| 4,362,924 | 12/1982 | Story et al. ......................... | 219/492 |
| 4,378,486 | 3/1983 | Yunik et al. ........................ | 219/492 |

FOREIGN PATENT DOCUMENTS

| | | | |
|---|---|---|---|
| 1615310 | 8/1971 | Fed. Rep. of Germany ...... | 219/494 |
| 1798231 | 2/1972 | Fed. Rep. of Germany ...... | 219/492 |

OTHER PUBLICATIONS

Industrie-Elektrik und Elektronic, German, 8/1975, pp. 156/160, vol. 20.

Primary Examiner—M. H. Paschall
Attorney, Agent, or Firm—Thomas W. Speckman

[57] ABSTRACT

A regulator circuit for controlling the heat output of a heating element adapted to be switched on and off by a semiconductor switch energized by a zero crossing switch having cycle group control, whereby a sensor signal derived from the sensed temperature is supplied to the zero crossing switch. In order to avoid an overriding of the control or operating temperature in the heating phase and to improve the accuracy of the temperature control, a secondary control voltage is derived from the sensor voltage according to the rate of rise and drop of the sensor voltage which in the heat phase the switch-off of the heating element is reset to lower temperatures depending on the secondary control voltage and in the cooling phase the switch-on of the heating element is reset to higher temperatures depending on the secondary control voltage.

22 Claims, 3 Drawing Figures

4,629,852

REGULATOR CIRCUIT FOR CONTROL OF HEAT OUTPUT OF A HEATING ELEMENT

BACKGROUND OF THE INVENTION

This invention relates to a regulator circuit for controlling the heat output of a heating element adapted to be switched on and off by a semiconductor switch energized by a zero crossing switch having regulator for control of periodical oscillations means, whereby a sensor signal derived from the sensed temperature is supplied to the zero crossing switch.

A circuit arrangement of this type takes advantage of the thermal inertia of heating elements, a property normally considered a liability. The heating up and cooling off of an electric heating element does not take place quickly, but requires a certain period of time, anywhere from seconds to minutes. If the electric power is supplied to the heating element in the form of pulse series from the main power supply, in which, for example, the number of switched on and switched off power supply fluctuations is varied, the medium value of the heat output can be fine tuned.

Since in this so-called regulator for control of periodical oscillations only semi-conductors are used for activating or deactivating the heating element, the life duration of the contact is immaterial. Moreover, with the selected control circuit, the switching time moves near the zero crossing of the power supply, so that at small voltages only small currents will pass. This is an additional safeguard to assure a long life of the switch.

The regulator for control of periodical oscillations is simply analogously realized in that a sensor signal is applied to an integrated circuit, known as a zero crossing switch, where it is superimposed upon a saw-tooth wave to control the ON time of the zero crossing switch independently of the sensor signal.

There are applications in which the heating element is installed in a hot plate, for example, to heat cookware, the temperature of the contents of which is being monitored. This type of heating system possesses a great deal of thermal inertia both in the heating phase and in the cooling phase. The result is that even if a circuit of the foregoing type is used, it is possible that the contents of the cooking vessel are overheated. This is simply due to the fact that after the heating element is turned off at the preset control temperature, the entire heating system continues to heat up because of its great inertia and may even reach a yet higher temperature. The danger of overheating also depends on the heating system, for example, the heat capacity of the heating element, the size of the cooking vessel and the volume of the contents of the vessel. This overheating at the end of the heating phase is undesirable also for reasons of energy inefficiency.

SUMMARY OF THE INVENTION

It is therefore an object of this invention to provide improvements in a circuit of the foregoing type such that a heating up of the heating element in excess of the preset control temperature is prevented and the accuracy of control of the heating and cooling phases is enhanced.

This is accomplished according to the invention in that a secondary control voltage is derived from the sensor voltage according to the rate of rise and/or drop of the sensor voltage, that in the heating phase the switch-off time of the heating element is moved to a greater or lesser extent to lower temperatures depending on the secondary control voltage, and that in the cooling phase the switch-on time of the heating element is reset to a greater or lesser extent to higher temperatures depending on the secondary control voltage.

By including the secondary control voltage in the control circuit of the sensor voltage, it is ensured that an automatic adjustment of the switch-on time and the switch-off time of the heating element is attained with the most diversified temperature-time characteristics of heating systems. A rapid temperature rise in the heating phase produces a large secondary control voltage which effects a great displacement of the switch-off time, so that the heating element is turned off long before the control or operating temperature is reached. If the temperature rises slowly in the heating phase, a substantially smaller secondary voltage is generated, so that the displacement of the switch-off time toward lower temperatures is not so large. With the circuit according to the invention, this shifting of the switch-on and switch-off times toward higher or lower temperatures, respectively, can be so directed that independently of the temperature-time curve of the heating system, temperatures in excess of the control or operating temperature in the heating phase are practically avoided. After the heating element has been turned off and the heating system is in the cooling off phase, the secondary control voltage changes its polarity. Thus, the control voltage is inversely affected, that is, the heating element is turned on while already at a higher temperature. The circuit hysteresis of the heating system can therefore be kept very small, resulting in an increased accuracy of temperature control.

The switch-off temperature in the heating phase adapts itself automatically to the heating system and its temperature-time curve. For example, with a cooking vessel filled to capacity, the switch-off temperature is moved closer to the operating temperature than with a partly filled cooking vessel, without the necessity of making adjustments or resettings. Thus, the circuit is independent of the particular type of heating system and takes the respective temperature-time characteristic automatically into account to select the most appropriate switch-on and switch-off times for the heating element in relation to the preset control or operating temperature.

The layout of the circuit depends on the sensor voltage as a function of the temperature. Thus, one embodiment of the invention is characterized in that the sensor voltage is inversely proportional to the curve of the sensed temperature, that in the heating phase the secondary control voltage is subtracted from the sensor voltage and in the cooling phase is added to the sensor voltage, that a threshold value voltage is supplied to the zero crossing switch, that the zero crossing switch is released to energize the semiconductor switch when the threshold value voltage is exceeded by the sensor voltage including the superimposed secondary control voltage, and that the zero crossing switch is blocked to prevent the energization of the semiconductor switch when the threshold voltage is lower than the sensor voltage including the secondary superimposed control voltage.

Similar results are obtained according to another embodiment of the invention which is characterized in that the sensor voltage is proportional to the curve of the sensed temperature, that in the heating phase the secondary control voltage is added to the sensor voltage and in the cooling phase is subtracted from the sensor voltage, that a threshold value voltage is supplied to the zero crossing switch, that the zero crossing switch is blocked to prevent energization of the semiconductor switch when the threshold value voltage is exceeded by the sensor voltage including the superimposed secondary control voltage, and that the zero crossing switch is released to energize the semiconductor switch when the threshold voltage is lower than the sensor voltage including the secondary superimposed control voltage.

A simplified circuit for the desired superimposition of the sensor voltage by the secondary control voltage is characterized in that the sensor voltage is applied, preferably across a resistor, to the noninverting input of an operational amplifier to pass to a series circuit comprising a resistor and a capacitor, that the connecting point between the resistor and the capacitor of the series circuit is connected across another resistor to the inverting input of the operational amplifier, and that the inverting input of the operational amplifier is connected to a feedback resistor to the output of the operational amplifier, whereby the relationship between the feedback resistor and the resistor connected in advance of the inverting input of the operational amplifier determines the degree of amplification of the secondary control voltage derived from the sensor voltage at the output of the operational amplifier.

In order to render the circuit insensitive to interference pulses, another embodiment provides that the sensor voltage is supplied to the operational amplifier across a low pass formed by a longitudinal resistor and a transverse capacitor. High frequency portions of the input voltage are short circuited by the transverse capacitor of the low pass.

For heating systems comprising a hot plate and a cooking vessel including contents, another embodiment has been found advantageous which is characterized in that the time constant of the series circuit consisting of a resistor and a capacitor is approximately 10 to 20 seconds.

BRIEF DESCRIPTION OF THE DRAWING

The invention will be further described with reference to a representative embodiment illustrated in the drawings, in which.

DESCRIPTION OF PREFERRED EMBODIMENTS

Figure 1:
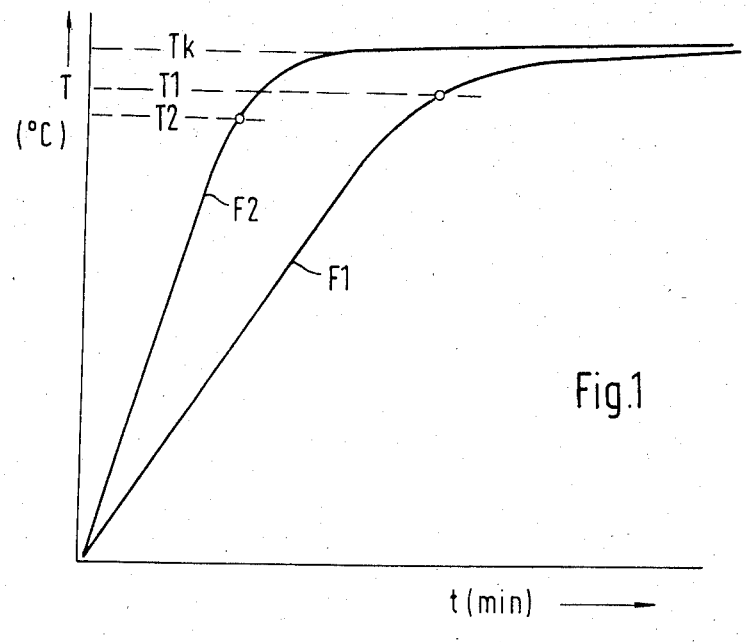
FIG. 1 is a temperature-time graph of heating systems having varying heating phases.

The graph of FIG. 1 shows the temperature-time curves of idealized heating phases when the regulator for control of periodical oscillations of a zero crossing circuit is additionally subjected to a secondary control voltage superimposed upon the sensor voltage. The curve F1 shows the temperature rise to be slower than curve F2. This is so because the entire heating system of curve F1 requires more energy. As applied to a hot plate or cooktop having a present maximum heat output, this may signify that curve F1 represents a cooking vessel larger than that of curve F2 or, if of the same size, its contents are of a greater volume.

As is indicated in FIG. 1, the heating system is set at a control or operating temperature designated Tk. According to the invention, the first switch-off time of the heating element is reset to lower temperatures T1 and T2, respectively. The resetting is greater with the steeper temperature rise. This has the result that because of the thermal inertia of the heating system it is practically impossible to override the set control or operating temperature.

Figure 2:
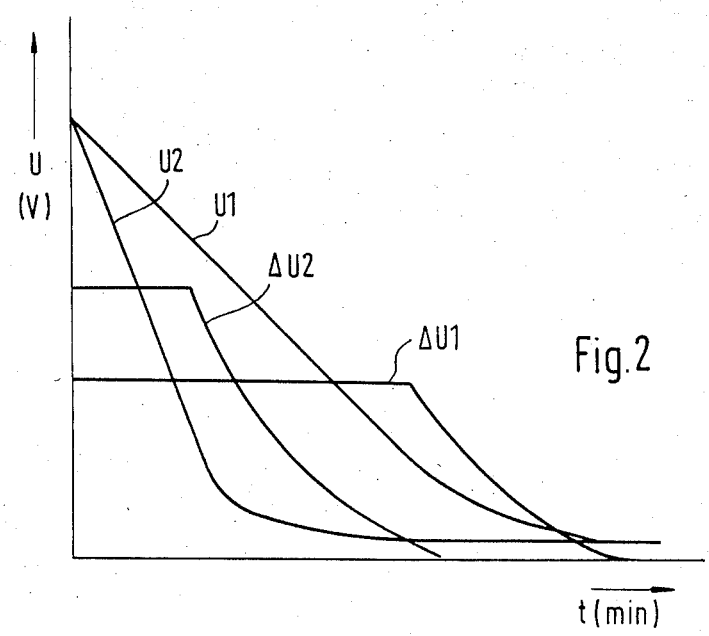
FIG. 2 is a graph of the sensor voltages and the secondary control voltages produced according to the heating systems of FIG. 1.

As is shown in FIG. 2, the temperature-time characteristic yields a sensor voltage U1 and U2, respectively, which in the selected embodiments is inversely proportional to the temperature, as is indicated by the function $U1=f(t)$ and $U2=f(t)$. In addition, the sensor voltage U1 and U2 yield secondary control voltage $\Delta U1$ and $\Delta U2$ which are proportional to the slope of the temperature-time curves. Thus, the steeper curve F2 yields a larger secondary control voltage $\Delta U2$. The secondary control voltage $\Delta U1$ and $\Delta U2$ remains constant during the steady rise and then decreasing slope, as is shown in FIG. 2.

A primary object of the present invention is to reset the shut-off of the heating element automatically so that, independently of the curves F1 and F2 of different temperature-time characteristics, the control or operating temperature will never be exceeded. For this purpose, the invention superimposes the secondary control voltage $\Delta U1$ or $\Delta U2$, respectively, upon the sensor voltage U1 and U2, respectively.

Figure 3:
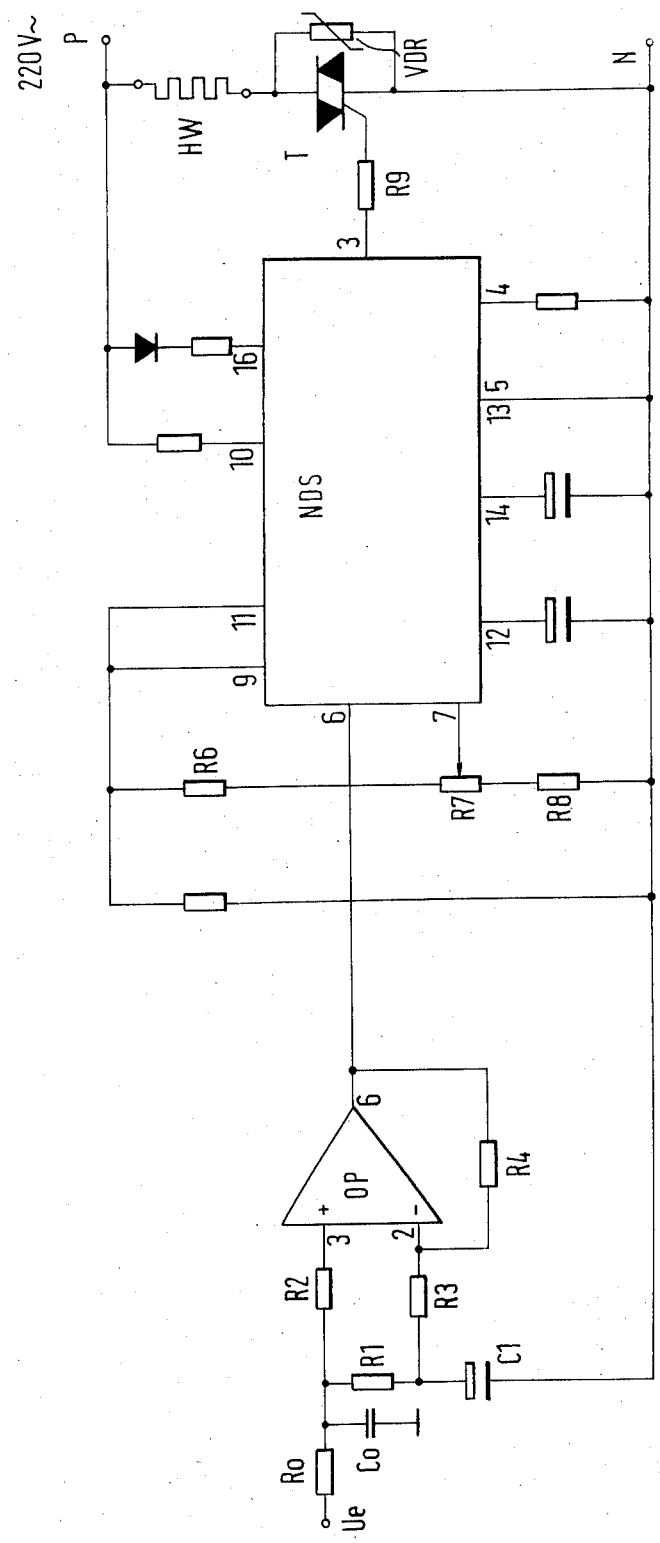
FIG. 3 is a schematic diagram including an operational amplifier for superimposing the sensor voltage and a secondary control voltage derived therefrom, with the operational amplifier controlling a zero crossing switch for activating a semiconductor connected in advance of a heating element.

In order to bring about superimposition, the sensor voltage U1 or U2, respectively, is applied as the input voltage Ue to a circuit illustrated in FIG. 3. The longitudinal resistor Ro and the transverse capacitor Co form a low pass by which high frequency noise pulses of input signal Ue are short circuited and kept away from series connected operational amplifier OP. The sensor voltage U1 or U2, respectively, is connected across resistor R2 to noninverting input 3 of operational amplifier OP and feeds the series circuit of the resistor R1 and the capacitor C1.

The sensor voltage U1 or U2, respectively, is of equal magnitude and polarity also at output 6 of operational amplifier OP, if constant. Since capacitor C1 of the series circuit of resistor R1 and capacitor C1 is also charged by sensor voltage U1 and U2, no current will flow through the resistor R1. Thus, the same sensor voltage U1 or U2, respectively, is applied to noninverting input terminal 3 and the inverting input terminal 2 of operational amplifier OP across resistors R2 and R3, so that both inputs 2 and 3 and output 6 of the operational amplifier OP have the same potential, namely, that of sensor voltage U1 or U2, respectively.

If changes occur in sensor voltage U1 or U2, current is caused to flow through resistor R1. Thus, the voltage drops at resistor R1, which voltage drop depends on the direction of the change occurring in sensor voltage U1 or U2, respectively, for example, the capacitor is either additionally charged or is discharged. The voltage drop at resistor R1 is amplified by operational amplifier OP and is added to or subtracted from the voltage supplied to output terminal 6. The gain is determined by feedback resistor R4 connected between output terminal 6 and inverting input terminal 2 of operational amplifier OP, and resistor R3.

At output terminal 6 of operational amplifier OP is a control voltage which consists of the sensor voltage U1 or U2, respectively, and the superimposed amplified secondary control voltage $\Delta U1$ or $\Delta U2$, respectively. This control voltage is supplied to control input 6 of zero crossing switch NDS. Zero crossing switch NDS may be an integrated circuit commercially available under the model designation TDA 1023. The voltage divider comprising resistors R6, R7 and R8 is tapped to obtain a threshold value voltage for control input terminal 7 of zero crossing switch NDS. As long as the control voltage at control input terminal 6 exceeds the threshold voltage at control input 7, the zero crossing switch NDS operates to control semiconductor switch T, which may be a thyristor, for example, by making use of the so called regulator for control of periodical oscillations, with the saw-tooth wave signal exiting from terminal 12. If the control voltage at control input terminal 6 is lower than the threshold voltage at control input terminal 7, the zero crossing switch NDS is blocked from energizing semiconductor switch T. However, within the control region the pulse-shaped energization signal of semiconductor switch T is maintained.

The control circuit of semiconductor T is energized by output 3 of zero crossing switch NDS across resistor R9 to connect heating element HW to alternating voltage source of 220 V at terminals P and N. Connected in parallel with semiconductor switch T is voltage dependent resistor VDR. Semiconductor switch T may be a thyristor.

It will be understood that the circuit according to the invention may be obtained also with a sensor voltage U1 or U2, respectively, which is directly proportional to the temperature T. In that case, the zero crossing switch NDS is blocked to prevent an energization of semiconductor switch T, as sensor voltage U1 or U2, respectively, including superimposed and added secondary control voltage $\Delta U1$ or $\Delta U2$, respectively, exceeds the threshold voltage. Conversely, zero crossing switch NDS is unblocked to permit energization of semiconductor switch T when sensor voltage U1 or U2, respectively, including the superimposed and subtracted secondary control voltage $\Delta U1$ or $\Delta U2$, respectively, drops below the threshold value. For this purpose, it is sufficient to exchange control input terminals 6 and 7 of zero crossing switch NDS.

I claim:

1. Process for controlling the heat output of a heating element supplied with electrical power pulses switched on and off by a semiconductor switch energized by a zero crossing switch having a regulator means for control of periodical oscillations whereby the number of power supply pulses transmitted to control said heat output of said heating element is variable, comprising the steps of:
    deriving a sensor voltage (U1, U2) from a temperature sensing means, said sensor voltage (U1, U2) inversely proportional to a temperature-time curve (F1, F2) derived from said sensed temperature over time;
    deriving a secondary control voltage ($\Delta U1$, $\Delta U2$) from said sensor voltage, dependent upon the slope of said sensor voltage measured over time;
    combining said secondary control voltage ($\Delta U1$, $\Delta U2$) with said sensor voltage (U1, U2) at said zero crossing switch to regulate said periodical oscillations by subtracting said secondary control voltage ($\Delta U1$, $\Delta U2$) from said sensor voltage (U1, U2) in a heating phase and adding said secondary control voltage ($\Delta U1$, $\Delta U2$) to said sensor voltage (U1, U2) in a non-heating phase whereby the number of said power supply pulses transmitted to control said heating element in said heating phase causes said heating element to shut off at lower temperatures due to said secondary control voltage ($\Delta U1$, $\Delta U2$) and to shut off at higher temperatures in said non-heating phase due to said secondary control voltage ($\Delta U1$, $\Delta U2$);
    supplying a threshold voltage to said zero crossing switch (NDS);
    triggering said zero crossing switch (NDS) to energize said semiconductor switch (T) when said threshold voltage is exceeded by said sensor voltage (U1, U2) combined with said secondary control voltage ($\Delta U1$, $\Delta U2$); and
    blocking said zero crossing switch (NDS) to prevent energization of said semiconductor switch (T) when said threshold voltage is lower than said sensor voltage (U1, U2) combined with said secondary control voltage ($\Delta U1$, $\Delta U2$).

2. Apparatus for controlling the heat output of a heating element supplied with electrical power pulses and switched on and off by a semiconductor switch energized by a zero crossing switch having regulator means for control of periodical oscillations whereby the number of power supply pulses transmitted to control said heat output of said heating element is variable, comprising: sensing means deriving a sensor voltage (U1, U2) from a sensed temperature, said sensor voltage (U1, U2) inversely proportional to a temperature-time curve (F1, F2) derived from said sensed temperature over time, and supplying said sensor voltage to said zero crossing switch; means for deriving a secondary control voltage ($\Delta U1$, $\Delta U2$) from said sensor voltage (U1, U2) dependent upon the slope of said sensor voltage measured over time and supplying said secondary control voltage to said zero crossing switch; means for combining said secondary control voltage ($\Delta U1$, $\Delta U2$) with said sensor voltage (U1, U2) at said zero crossing switch comprising means for subtracting said secondary control voltage ($\Delta U1$, $\Delta U2$) from said sensor voltage (U1, U2) during a heating phase and means for adding said secondary control voltage ($\Delta U1$, $\Delta U2$) to said sensor voltage (U1, U2) during a non-heating phase and means for regulating said periodical oscillations whereby the number of said power supply pulses transmitted to control said heating element in said heating phase causes said heating element to shut off at lower temperatures due to said secondary control voltage ($\Delta U1$, $\Delta U2$) and to shut off at higher temperatures in said non-heating phase due to said secondary control voltage ($\Delta U1$, $\Delta U2$); means for supplying a threshold voltage to said zero crossing switch (NDS); means for triggering said zero crossing switch (NDS) to energize said semiconductor switch (T) when said threshold voltage is exceeded by said sensor voltage (U1, U2) combined with said secondary control voltage ($\Delta U1$, $\Delta U2$); and means for blocking said zero crossing circuit (NDS) to prevent energization of said semiconductor switch (T) when said threshold voltage is lower than said sensor voltage (U1, U2) combined with said secondary control voltage ($\Delta U1$, $\Delta U2$).

3. Process for controlling the heat output of a heating element supplied with electrical power pulses switched on and off by a semiconductor switch energized by a zero crossing switch having a regulator means for control of periodical oscillations whereby the number of power supply pulses transmitted to control said heat output of said heating element is variable, comprising the steps of:

deriving a sensor voltage (U1, U2) from a temperature sensing means, said sensor voltage (U1, U2) proportional to a temperature-time curve (F1, F2) derived from said sensed temperature over time, applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), and said inverting input (2) of said operational amplifier connected across a feedback resistor (R4) to an output terminal (6) of said operational amplifier (OP);

deriving a secondary control voltage (ΔU1,ΔU2) from said sensor voltage, dependent upon the slope of said sensor voltage measured over time whereby the relationship between said feedback resistor (R4) and said resistor (R3) connected in advance of said inverting input (2) of said operational amplifier (OP) determines the gain of said secondary control voltage (ΔU1,ΔU2) derived from said sensor voltage (U1, U2) at said output terminal (6) of said operational amplifier (OP);

combining said secondary control voltage (ΔU1,ΔU2) with said sensor voltage (U1, U2) at said zero crossing switch to regulate said periodical oscillations by adding said secondary control voltage (ΔU1,ΔU2) to said sensor voltage (U1, U2) in a heating phase and subtracting said secondary control voltage (ΔU1,ΔU2) from said sensor voltage (U1, U2) in a non-heating phase whereby the number of said power supply pulses transmitted to control said heating element in said heating phase causes said heating element to shut off at lower temperatures due to said secondary control voltage (ΔU1,ΔU2) and to shut off at higher temperatures in said non-heating phase due to said secondary control voltage (ΔU1,ΔU2);

supplying a threshold voltage to said zero crossing switch (NDS);

blocking said zero crossing switch (NDS) to prevent energization of said semiconductor switch (T) when said threshold voltage is exceeded by said sensor voltage (U1, U2) combined with said secondary control voltage (ΔU1,ΔU2); and triggering said zero crossing switch (NDS) to energize said semicondctor switch (T) when said threshold voltage is lower than said sensor voltage (U1, U2) combined with said secondary control voltage (ΔU1,ΔU2).

4. Process according to claim 3, characterized in that said sensor voltage (U1, U2) is supplied to said operational amplifier (OP) across a low pass formed by longitudinal resistor (Ro) and transverse capacitor (Co).

5. Process according to claim 4, characterized in that the time constant of said series circuit is approximately 10 to 20 seconds.

6. Process for controlling the heat output of a heating element supplied with electrical power pulses switched on and off by a semiconductor switch energized by a zero crossing switch having a regulator means for control of periodical oscillations whereby the number of power supply pulses transmitted to control said heat output of said heating element is variable, comprising the steps of:

deriving a sensor voltage (U1, U2) from a temperature sensing means, said sensor voltage (U1, U2) inversely proportional to a temperature-time curve (F1, F2) derived from said sensed temperature over time, applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), said inverting input (2) of said operational amplifier (OP) connected across a feedback resistor (R4) to an output terminal (6) of said operational amplifier (OP);

deriving a secondary control voltage (ΔU1,ΔU2) from said sensor voltage, dependent upon the slope of said sensor voltage measured over time whereby the relationship between said feedback resistor (R4) and said resistor (R3) connected in advance of said inverting input (2) of said operational amplifier (OP) determines the gain of said secondary control voltage (ΔU1,ΔU2) derived from said sensor voltage (U1, U2) at said output terminal (6) of said operational amplifier (OP);

combining said secondary control voltage (ΔU1,-ΔU2) with said sensor voltage (U1, U2) at said zero crossing switch to regulate said periodical oscillations by subtracting said secondary control voltage (ΔU1,ΔU2) from said sensor voltage (U1, U2) in a heating phase and adding said secondary control voltage (ΔU1,ΔU2) to said sensor voltage (U1, U2) in a non-heating phase whereby the number of said power supply pulses transmitted to control said heating element in said heating phase causes said heating element to shut off at lower temperatures due to said secondary control voltage (ΔU1,ΔU2) and to shut off at higher temperatures in said non-heating phase due to said secondary control voltage (ΔU1,ΔU2);

supplying a threshold voltage to said zero crossing switch (NDS);

triggering said zero crossing switch to energize said semiconductor switch (T) when said threshold voltage is exceeded by said sensor voltage (U1, U2) combined with said secondary control voltage (ΔU1,ΔU2); and blocking said zero crossing switch to prevent energization of said semiconductor switch (T) when said threshold voltage is lower than said sensor voltage (U1, U2) combined with said secondary control voltage (ΔU1,ΔU2).

7. Process according to claim 6, characterized in that said sensor voltage (U1, U2) is supplied to said operational amplifier (OP) across a low pass formed by longitudinal resistor (Ro) and transverse capacitor (Co).

8. Process according to claim 7, characterized in that the time constant of said series circuit is approximately 10 to 20 seconds.

9. Process for controlling the heat output of a heating element supplied with electrical power pulses switched on and off by a semiconductor switch energized by a zero crossing switch having a regulator means for control of periodical oscillations whereby the number of power supply pulses transmitted to control said heat output of said heating element is variable, comprising the steps of:

deriving a sensor voltage (U1, U2) from a temperature sensing means, applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), and said inverting input (2) of said operational amplifier (OP) connected across a feedback resistor (R4) to an output terminal (6) of said operational amplifier (OP);

deriving a secondary control voltage ($\Delta$U1,$\Delta$U2) from said sensor voltage, dependent upon the slope of said sensor voltage measured over time whereby the relationship between said feedback resistor (R4) and said resistor (R3) connected in advance of said inverting input (2) of said operational amplifier (OP) determines the gain of said secondary control voltage ($\Delta$U1,$\Delta$U2) derived from said sensor voltage (U1, U2) at said output terminal (6) of said operational amplifier (OP); and combining said secondary control voltage ($\Delta$U1,$\Delta$U2) with said sensor voltage (U1, U2) at said zero crossing switch to regulate said periodical oscillations whereby the number of said power supply pulses transmitted to control said heating element in a heating phase causes said heating element to shut off at lower temperatures due to said secondary control voltage ($\Delta$U1,$\Delta$U2) and to shut off at higher temperatures in a non-heating phase due to said secondary control voltage ($\Delta$U1,$\Delta$U2).

10. Process according to claim 9, characterized in that said sensor voltage (U1, U2) is supplied to said operational amplifier (OP) across a low pass formed by longitudinal resistor (Ro) and transverse capacitor (Co).

11. Process according to claim 10, characterized in that the time constant of said series circuit is approximately 10 to 20 seconds.

12. Apparatus for controlling the heat output of a heating element supplied with electrical power pulses and switched on and off by a semiconductor switch energized by a zero crossing switch having regulator means for control of periodical oscillations whereby the number of power supply pulses transmitted to control said heat output of said heating element is variable, comprising: sensing means deriving a sensor voltage (U1, U2) from a sensed temperature, said sensor voltage (U1, U2) proportional to a temperature-time curve (F1, F2) derived from said sensed temperature over time, means for applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), said inverting input (2) of said operational amplifier (OP) connected across a feedback resistor (R4) to the output terminal (6) of said operational amplifier (OP), and supplying said sensor voltage to said zero crossing switch; means for deriving a secondary control voltage ($\Delta$U1, $\Delta$U2) from said sensor voltage (U1, U2) dependent upon the slope of said sensor voltage measured over time whereby the relationship between said feedback resistor (R4) and said resistor (R3) connected in advance of said inverting input (2) of said operational amplifier (OP) determines the gain of said secondary control voltage ($\Delta$U1, $\Delta$U2) derived from said sensor voltage (U1, U2) at said output terminal (6) of said operational amplifier (OP) and supplying said secondary control voltage to said zero crossing switch; means for combining said secondary control voltage ($\Delta$U1, $\Delta$U2) with said sensor voltage (U1, U2) at said zero crossing switch comprising means for adding said secondary control voltage ($\Delta$U1, $\Delta$U2) to said sensor voltage (U1, U2) during a heating phase and means for subtracting said secondary control voltage ($\Delta$U1, $\Delta$U2) from said sensor voltage (U1, U2) during a non-heating phase, and means for regulating said periodical oscillations whereby the number of said power supply pulses transmitted to control said heating element in said heating phase causes said heating element to shut off at lower temperatures due to said secondary control voltage ($\Delta$U1, $\Delta$U2) and to shut off at higher temperatures in said non-heating phase due to said secondary control voltage ($\Delta$U1, $\Delta$U2); means for supplying a threshold voltage to said zero crossing switch (NDS); means for blocking said zero crossing switch (NDS) to prevent energization of said semiconductor switch (T) when said threshold voltage is exceeded by said sensor voltage (U1, U2) combined with said secondary control voltage ($\Delta$U1, $\Delta$U2); and means for triggering said zero crossing switch (NDS) to energize said semiconductor switch (T) when said threshold voltage is lower than said sensor voltage (U1, U2) combined with said secondary control voltage ($\Delta$U1, $\Delta$U2).

13. Apparatus according to claim 12, characterized in that said sensor voltage (U1, U2) is supplied to said operational amplifier (OP) across a low pass comprising longitudinal resistor (Ro) and transverse capacitor (Co).

14. Apparatus according to claim 13, characterized in that the time constant of said series circuit is approximately 10 to 20 seconds.

15. Apparatus for controlling the heat output of a heating element supplied with electrical power pulses and switched on and off by a semiconductor switch energized by a zero crossing switch having regulator means for control of periodical oscillations whereby the number of power supply pulses transmitted to control said heat output of said heating element is variable, comprising: sensing means deriving a sensor voltage (U1, U2) from a sensed temperature, said sensor voltage (U1, U2) inversely proportional to a temperature-time curve (F1, F2) derived from said sensed temperature over time, means for applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), said inverting input (2) of said operational amplifier (OP) connected across a feedback resistor (R4) to the output terminal (6) of said operational amplifier (OP), and supplying said sensor voltage to said zero crossing switch; means for deriving a secondary control voltage ($\Delta$U1, $\Delta$U2) from said sensor voltage (U1, U2) dependent upon the slope of said sensor voltage measured over time whereby the relationship between said feedback resistor (R4) and said resistor (R3) connected in advance of said inverting input (2) of said operational amplifier (OP) determines the gain of said secondary control voltage ($\Delta U1$, $\Delta U2$) derived from said sensor voltage (U1, U2) at said output terminal (6) of said operation amplifier (OP), and supplying said secondary control voltage to said zero crossing switch; means for combining said secondary control voltage ($\Delta U1$, $\Delta U2$) with said sensor voltage (U1, U2) at said zero crossing switch comprising means for subtracting said secondary control voltage ($\Delta U1$, $\Delta U2$) from said sensor voltage (U1, U2) during a heating phase and means for adding said secondary control voltage ($\Delta U1$, $\Delta U2$) to said sensor voltage (U1, U2) during a non-heating phase and means for regulating said periodical oscillations whereby the number of said power supply pulses transmitted to control said heating element in said heating phase causes said heating element to shut off at lower temperatures due to said secondary control voltage ($\Delta U1$, $\Delta U2$) and to shut off at higher temperatures in said non-heating phase due to said secondary control voltage ($\Delta U1$, $\Delta U2$); means for supplying a threshold voltage to said zero crossing switch (NDS); means for triggering said zero crossing switch (NDS) to energize said semiconductor switch (T) when said threshold voltage is exceeded by said sensor voltage (U1, U2) combined with said secondary control voltage ($\Delta U1$, $\Delta U2$); and means for blocking said zero crossing circuit (NDS) to prevent the energization of said semiconductor switch (T) when said threshold voltage is lower than said sensor voltage (U1, U2) combined with said secondary control voltage ($\Delta U1$, $\Delta U2$).

16. Apparatus according to claim 15, characterized in that said sensor voltage (U1, U2) is supplied to said operational amplifier (OP) across a low pass comprising longitudinal resistor (Ro) and transverse capacitor (Co).

17. Apparatus according to claim 16, characterized in that the time constant of said series circuit is approximately 10 to 20 seconds.

18. Apparatus for controlling the heat output of a heating element supplied with electrical power pulses and switched on and off by a semiconductor switch energized by a zero crossing switch having regulator means for control of periodical oscillations whereby the number of power supply pulses transmitted to control said heat output of said heating element is variable, comprising: sensing means deriving a sensor voltage (U1, U2) from a sensed temperature, means for applying said sensor voltage (U1, U2) across a resistor (R2) to the noninverting input (3) of an operational amplifier (OP), feeding a series circuit comprising a resistor (R1) and a capacitor (C1), said series circuit connected between said resistor (R1) and said capacitor (C1) through a resistor (R3) to the inverting input (2) of said operational amplifier (OP), said inverting input (2) of said operational amplifier (OP) connected across a feedback resistor (R4) to the output terminal (6) of said operational amplifier (OP), and supplying said sensor voltage to said zero crossing switch; means for deriving a secondary control voltage ($\Delta U1$, $\Delta U2$) from said sensor voltage (U1, U2) dependent upon the slope of said sensor voltage measured over time whereby the relationship between said feedback resistor (R4) and said resistor (R3) connected in advance of said inverting input (2) of said operational amplifier (OP) determines the gain of said secondary control voltage ($\Delta U1$, $\Delta U2$) derived from said sensor voltage (U1, U2) at said output terminal (6) of said operational amplifier (OP), and supplying said secondary control voltage to said zero crossing switch; means for combining said secondary control voltage ($\Delta U1$, $\Delta U2$) with said sensor voltage (U1, U2) at said zero crossing switch and means for regulating said periodical oscillations whereby the number of said power supply pulses transmitted to control said heating element in a heating phase causes said heating element to shut off at lower temperatures due to said secondary control voltage ($\Delta U1$, $\Delta U2$) and to shut off at higher temperatures in a non-heating phase due to said secondary control voltage ($\Delta U1$, $\Delta U2$).

19. Apparatus according to claim 18, characterized in that sais sensor voltage (U1, U2) is supplied to said operational amplifier (OP) across a low pass comprising longitudinal resistor (Ro) and transverse capacitor (Co).

20. Apparatus according to claim 19, characterized in that the time constant of said series circuit is approximately 10 to 20 seconds.

21. Process for controlling the heat output of a heating element supplied with electrical pulses switched on and off by a semiconductor switch energized by a zero crossing switch having a regulator means for control of periodical oscillations whereby the number of power supply pulses transmitted to control said heat output of said heating element is variable, comprising the steps of:

deriving a sensor voltage (U1, U2) from a temperature sensing means, said sensor voltage (U1, U2) proportional to a temperature-time curve (F1, F2) derived from said sensed temperature over time;

deriving a secondary control voltage ($\Delta U1$, $\Delta U2$) from said sensor voltage, dependent upon the slope of said sensor voltage measured over time;

combining said secondary control voltage ($\Delta U1$, $\Delta U2$) with said sensor voltage (U1, U2) at said zero crossing switch to regulate said periodical oscillations by adding said secondary control voltage ($\Delta U1$, $\Delta U2$) to said sensor voltage (U1, U2) in a heating phase and subtracting said secondary control voltage ($\Delta U1$, $\Delta U2$) from said sensor voltage (U1, U2) in a non-heating phase whereby the number of said power supply pulses transmitted to control said heating element in said heating phase causes said heating element to shut off at lower temperatures due to said secondary control voltage ($\Delta U1$, $\Delta U2$) and to shut off at higher temperatures in said non-heating phase due to said secondary control voltage ($\Delta U1$, $\Delta U2$);

supplying a threshold voltage to said zero crossing switch (NDS);

blocking said zero crossing switch (NDS) to prevent energization of said semiconductor switch (T) when said threshold voltage is exceeded by said sensor voltage (U1, U2) combined with said secondary control voltage ($\Delta U1$, $\Delta U2$); and triggering said zero crossing switch (NDS) to energize said semiconductor switch (T) when said threshold voltage is lower than said sensor voltage (U1, U2) combined with said secondary control voltage ($\Delta U1$, $\Delta U2$).

22. Apparatus for controlling the heat output of a heating element supplied with electrical power pulses and switched on and off by a semiconductor switch energized by a zero crossing switch having regulator means for control of periodical oscillations whereby the number of power supply pulses transmitted to control said heat output of said heating element is variable, comprising: sensing means deriving a sensor voltage (U1, U2) from a sensed temperature, said sensor voltage (U1, U2) proportional to a time-temperature curve (F1, F2) derived from said sensed temperature over time, and supplying said sensor voltage to said zero crossing switch; means for deriving a secondary control voltage ($\Delta$U1, $\Delta$U2) from said sensor voltage (U1, U2) dependent upon the slope of said sensor voltage measured over time and supplying said secondary control voltage to said zero crossing switch; means for combining said secondary control voltage ($\Delta$U1, $\Delta$U2) with said sensor voltage (U1, U2) at said zero crossing switch comprising means for adding said secondary control voltage ($\Delta$U1, $\Delta$U2) to said sensor voltage (U1, U2) during a heating phase and means for subtracting said secondary control voltage ($\Delta$U1, $\Delta$U2) from said sensor voltage (U1, U2) during a non-heating phase and means for regulating said periodical oscillations whereby the number of said power supply pulses transmitted to control said heating element in said heating phase causes said heating element to shut off at lower temperatures due to said secondary control voltage ($\Delta$U1, $\Delta$U2) and to shut off at higher temperatures in said non-heating phase due to said secondary control voltage ($\Delta$U1, $\Delta$U2); means for supplying a threshold voltage to said zero crossing switch (NDS); means for blocking said zero crossing switch (NDS) to prevent energization of said semiconductor switch (T) when said threshold voltage is exceeded by said sensor voltage (U1, U2) combined with said secondary control voltage ($\Delta$U1, $\Delta$U2); and means for triggering said zero crossing switch (NDS) to energize said semiconductor switch (T) when said threshold voltage is lower than said sensor voltage (U1, U2) combined with said secondary control voltage ($\Delta$U1, $\Delta$U2).

* * * * *